(12) United States Patent
Suzuki (10) Patent No.: US 10,735,617 B2
(45) Date of Patent: Aug. 4, 2020

(54) DETECTION APPARATUS AND CONTROL METHOD

(71) Applicant: CANON KABUSHIKI KAISHA, Tokyo (JP)

(72) Inventor: Takumi Suzuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/282,928

(22) Filed: Feb. 22, 2019

(65) Prior Publication Data

US 2019/0268494 A1 Aug. 29, 2019

(30) Foreign Application Priority Data

Feb. 28, 2018 (JP) ................. 2018-035519

(51) Int. Cl.
*G03G 15/00* (2006.01)
*B65H 37/00* (2006.01)
*H04N 1/028* (2006.01)
*H04N 1/00* (2006.01)

(52) U.S. Cl.
CPC ..... *H04N 1/02825* (2013.01); *H04N 1/00477* (2013.01); *H04N 1/00909* (2013.01)

(58) Field of Classification Search
CPC .......... H04N 1/02825; H04N 1/00477; H04N 1/00909
USPC ............... 358/3.26, 1.12, 475; 399/9, 11, 23
See application file for complete search history.

(56) References Cited

U.S. PATENT DOCUMENTS

| 4,785,295 | A | * | 11/1988 | Fukui | B65H 7/14 340/679 |
| 6,153,888 | A | * | 11/2000 | Fournier | B65H 7/125 250/205 |
| 6,704,523 | B2 | * | 3/2004 | Takeuchi | B65H 7/14 250/559.4 |
| 9,804,548 | B2 | * | 10/2017 | Kato | B65H 20/02 |
| 2003/0007054 | A1 | * | 1/2003 | Namiki | G03G 15/65 347/101 |
| 2003/0021608 | A1 | * | 1/2003 | Morita | G03G 15/6502 399/23 |
| 2003/0031476 | A1 | * | 2/2003 | Takeuchi | B65H 7/14 399/16 |

FOREIGN PATENT DOCUMENTS

JP 9-240885 A 9/1997

* cited by examiner

*Primary Examiner* — Cheukfan Lee
(74) *Attorney, Agent, or Firm* — Canon U.S.A., Inc. IP Division

(57) ABSTRACT

An apparatus includes a second detection unit configured to detect whether there is a decrease in reflectance of a reflection unit for light, based on a second output value which is output by an output unit based on light which is received by a light receiving unit in a state in which, after a first output value is controlled to become a prescribed value, a light emitting unit is radiating light and it is detected by a first detection unit that a predetermined object is present in a path.

20 Claims, 7 Drawing Sheets

FIG.6B ically, for example, the present exemplary embodiment
DETECTION APPARATUS AND CONTROL METHOD

BACKGROUND OF THE INVENTION

Field of the Invention

Aspects of the embodiments generally relate to a detection apparatus and a control method.

Description of the Related Art

Heretofore, there has been known a detection apparatus of the optical type for detecting the presence or absence or the position of an object (see Japanese Patent Application Laid-Open No. 9-240885). The detection apparatus of the optical type detects an object by causing a light receiving element to receive light radiated from a light emitting element and then reflected from a reflective plate or an object targeted for detection.

Furthermore, in such a conventional detection method, if the reflectance of the reflective plate for light decreases due to such a reason as the adherence of a contamination to the reflective plate, the quantity of light reflected from the reflective plate becomes small, so that a false detection for an object may occur. While, under the circumstances the decrease of the reflectance of the reflective plate for light is occurring, for example, handling such as sending of an error notification to the user or cleaning of the reflective plate should be performed, no matter which handling is performed, it may become necessary to detect a decrease of the reflectance of the reflective plate for light. With the popularization of the detection apparatus of the optical type, detecting a decrease of the reflectance of the reflective plate for light has become increasingly demanded.

SUMMARY OF THE INVENTION

According to an aspect of the embodiments, an apparatus includes a reflection unit configured to reflect light, a light emitting unit configured to radiate light toward a direction in which the reflection unit is located, a light receiving unit configured to receive light from an external including light reflected from the reflection unit, an output unit configured to output an output value that is based on the received light, a first detection unit configured to detect, based on the output value, whether a predetermined object is present in at least a part of a path of light from a point at which the light is reflected to a point at which the light is received, a control unit configured to perform control such that a first output value which is output by the output unit based on the received light in a state in which the light emitting unit is radiating light and the predetermined object is not present in the path becomes a prescribed value, and a second detection unit configured to detect whether there is a decrease in reflectance of the reflection unit for light, based on a second output value which is output by the output unit based on the received light in a state in which, after the first output value is controlled to become the prescribed value, the light emitting unit is radiating light and it is detected by the first detection unit that the predetermined object is present in the path.

Further features of the disclosure will become apparent from the following description of exemplary embodiments with reference to the attached drawings.

DESCRIPTION OF THE EMBODIMENTS

A detection apparatus according to an exemplary embodiment of the disclosure is described. While, in the present exemplary embodiment, as the detection apparatus, a recording apparatus which detects a recording medium for use in printing based on reflected light from a reflective plate is described as an example, the present exemplary embodiment is not limited to this. The present exemplary embodiment can be applied to various apparatuses as long as those are apparatuses which perform processing based on reflected light from a reflective plate as a detection apparatus. Specifically, for example, the present exemplary embodiment can be applied to an apparatus which detects an object other than recording media based on reflected light from a reflective plate. For example, when the present exemplary embodiment is applied to a printer, examples of the printer include an inkjet printer, a full-color laser beam printer, and a monochrome printer.

Figure 1:
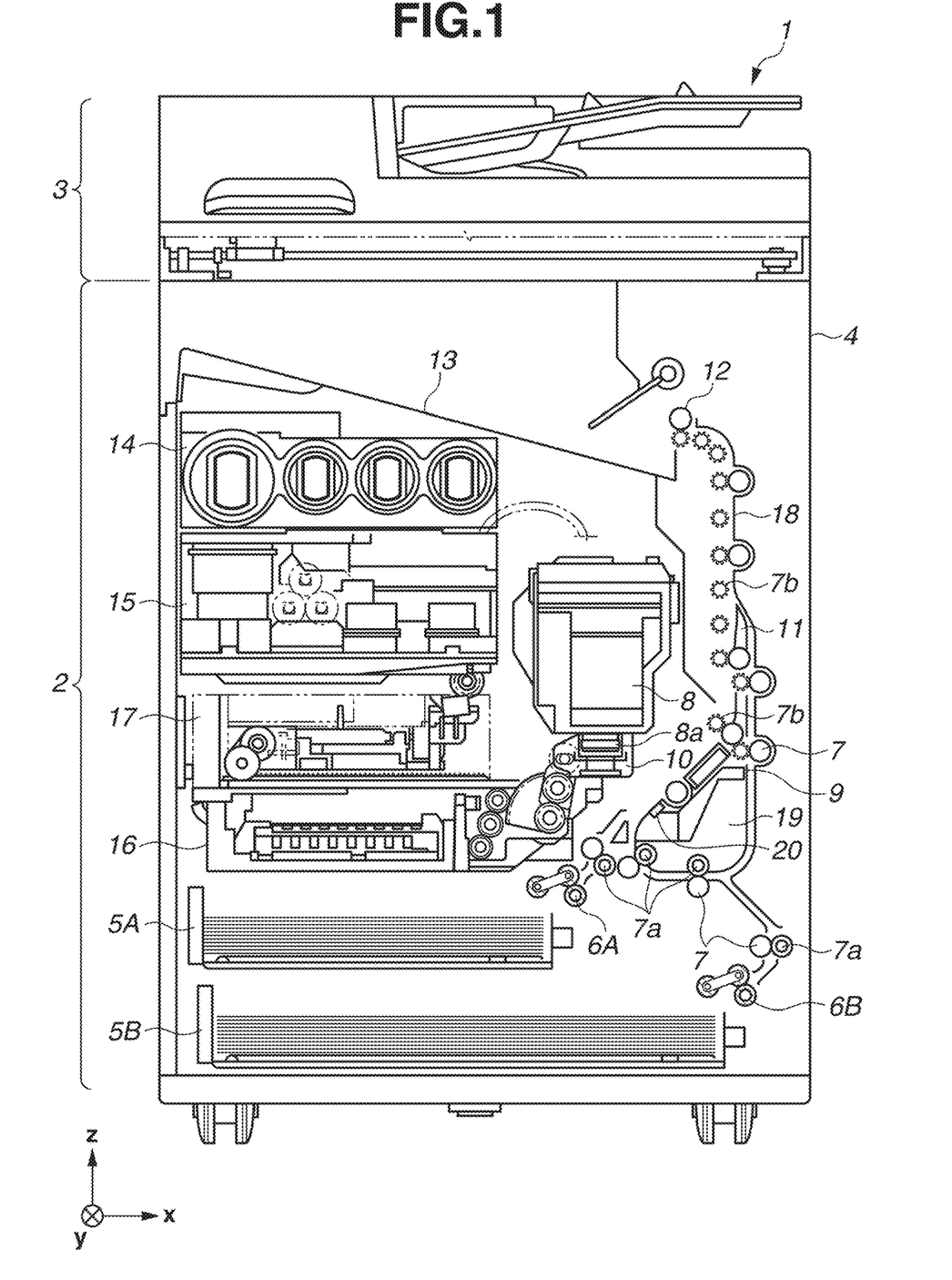
FIG. 1 is a diagram illustrating an internal structure of a detection apparatus.

FIG. 1 is a diagram illustrating an internal structure of a recording apparatus 1 which performs printing of the inkjet type (hereinafter referred to as a "recording apparatus 1"). In FIG. 1, the x-direction indicates the horizontal direction, the y-direction (direction perpendicular to the x-direction) indicates a direction in which ejection ports are arranged in a recording head 8 described below, and the z-direction indicates the vertical direction. In the present exemplary embodiment, the term "printing" refers to forming an image on a recording medium such as paper with use of a recording agent such as ink.

The recording apparatus 1 is a multifunction peripheral including a printing unit 2 and a scanner unit 3, and is able to perform various processing operations concerning a recording operation and a reading operation with the printing unit 2 and the scanner unit 3 operating in an individual manner or in conjunction with each other. The scanner unit 3 includes an automatic document feeder (ADF) and a flatbed scanner (FBS), and is able to perform reading of a document which is automatically fed by the ADF and reading of a document which is placed by the user on a document positioning plate of the FBS. Furthermore, while the present exemplary embodiment is directed to a multifunction peripheral including both the printing unit 2 and the scanner unit 3, a configuration including no scanner unit 3 can be employed. FIG. 1 illustrates the recording apparatus 1 being in a standby state, in which the recording apparatus 1 is performing neither a recording operation nor a reading operation.

In the printing unit 2, a first cassette 5A and a second cassette 5B each used to contain recording media (cut sheets) S are detachably mounted at a bottom portion which is a lower portion in the vertical direction of a casing 4. Relatively small recording media of up to A4 size are contained in the first cassette 5A, and relatively large recording media of up to A3 size are contained in the second cassette 5B, both in a horizontally stacked state. A first feed unit 6A used to feed contained recording media separately one by one is provided in the vicinity of the first cassette 5A. Likewise, a second feed unit 6B is provided in the vicinity of the second cassette 5B. When the recording operation is performed, a recording medium S is fed selectively from any one of the first cassette 5A and the second cassette 5B.

Conveyance rollers 7, a discharge roller 12, pinch rollers 7a, spurs 7b, a guide 18, an inner guide 19, and a diverter 11 are a conveyance mechanism for guiding a recording medium S in a predetermined direction. The conveyance rollers 7 are located at the upstream side and at the downstream side of the recording head 8, and are driving rollers which are driven by a conveyance motor (not illustrated). The pinch rollers 7a are driven rollers which rotate while nipping a recording medium S in conjunction with the conveyance rollers 7. The discharge roller 12 is located at the downstream side of the conveyance rollers 7, and is a driving roller which is driven by the conveyance motor (not illustrated). The spurs 7b pinch and convey a recording medium S in conjunction with the conveyance rollers 7 and the discharge roller 12 located at the downstream side of the recording head 8.

The guide 18 is provided in a conveyance path for a recording medium S, and guides the recording medium S in a predetermined direction. The inner guide 19 is a member extending in the y-direction and having a curved side surface, and guides a recording medium S along the side surface. The diverter 11 is a member used to switch a direction in which a recording medium S is conveyed at the time of a two-sided recording operation. A discharge tray 13 is a tray used to stack and hold thereon a recording medium S on which the recording operation has been completed and which has been discharged by the discharge roller 12.

A paper detection sensor 20 includes a light emitting element and a light receiving element in the present exemplary embodiment. A reflecting mirror (not illustrated) serving as a reflective plate is located at a position facing the paper detection sensor 20 across the conveyance path. The light emitting element radiates light toward a direction in which the reflective plate is located. Then, the reflective plate reflects light incident from the light emitting element at the reflecting mirror. The light receiving element receives light from an external including light reflected from the reflective plate. Furthermore, while a recording medium S is passing through the position facing the paper detection sensor 20, the light receiving element receives light from an external including light reflected from the recording medium S. The paper detection sensor 20 uses these configurations to identify an output value (output data) that is based on light from an external and thus to detect (sense) an object (recording medium). Specifically, the paper detection sensor 20 detects an object which passes through at least a part of a path for light from a point at which the light is reflected by a reflective plate to a point at which the light is received by the light receiving element, based on an output value that is based on light received by the light receiving element in a state in which the object is passing through at least a part of the path. The paper detection sensor 20 detects the presence or absence of the recording medium S in this way, thus being able to detect the positions of the leading edge and trailing edge of the recording medium S and having a conveyance control function for monitoring the conveyance state of the recording medium S. Furthermore, a plurality of paper detection sensors 20 can also be located at conveyance paths other than the illustrated place.

The recording head 8 in the present exemplary embodiment is a color inkjet recording head of the full-line type, in which a plurality of ejection ports for ejecting ink according to recording data is arranged as much as the length corresponding to the width of the recording medium S along the y-direction in FIG. 1. When the recording head 8 is in a standby state, an ejection port surface 8a of the recording head 8 is capped by a cap unit 10 as illustrated in FIG. 1. When the recording operation is performed, the orientation of the recording head 8 is changed by a print controller 202, which is described below, in such a manner that the ejection port surface 8a faces a platen 9. The platen 9, which is composed of a flat plate extending in the y-direction, supports a recording medium S on which the recording operation is performed by the recording head 8. The movement of the recording head 8 from the standby position to the recording position is described below in detail.

An ink tank unit 14 reserves inks of four colors which are to be supplied to the recording head 8. An ink supply unit 15 is provided at the halfway portion of a flow path which interconnects the ink tank unit 14 and the recording head 8, and adjusts the pressure and the flow rate of ink contained in the recording head 8 to appropriate ranges. In the present exemplary embodiment, a circulation type ink supply system is employed, in which the ink supply unit 15 adjusts the pressure of ink which is supplied to the recording head 8 and the flow rate of ink which is recovered from the recording head 8 to appropriate ranges.

A maintenance unit 16, which includes the cap unit 10 and a wiping unit 17, causes these units to operate at predetermined timing to perform a maintenance operation on the recording head 8.

Figure 2:
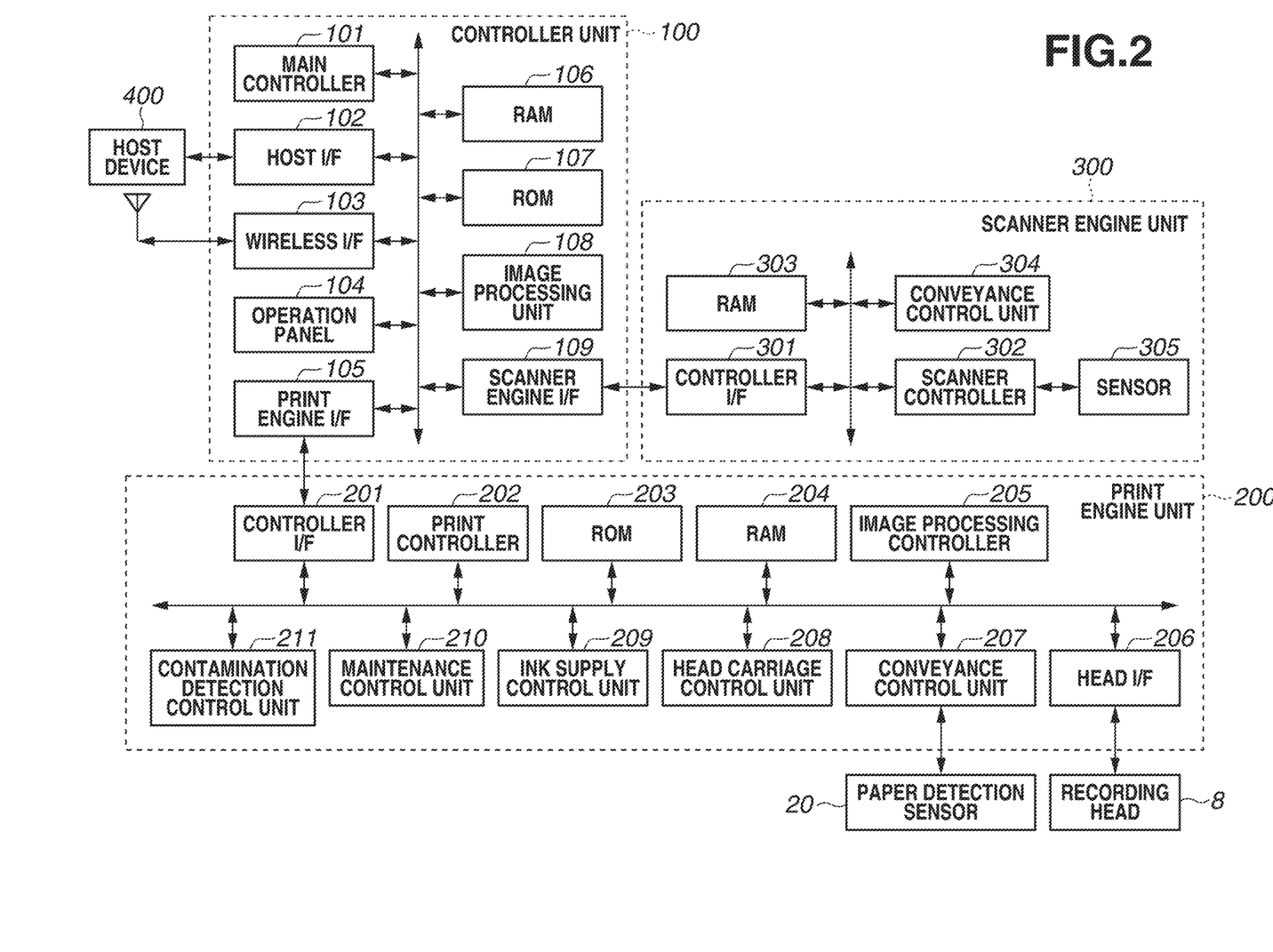
FIG. 2 is a diagram illustrating a control configuration of the detection apparatus.

FIG. 2 is a block diagram illustrating a control configuration in the recording apparatus 1. The control configuration mainly includes a print engine unit 200, which comprehensively controls the printing unit 2, a scanner engine unit 300, which comprehensively controls the scanner unit 3, and a controller unit 100, which comprehensively controls the entire recording apparatus 1. The print controller 202 controls various mechanisms of the print engine unit 200 according to instructions from a main controller 101 of the controller unit 100. Various mechanisms of the scanner engine unit 300 are controlled by the main controller 101 of the controller unit 100. Details of the control configuration are described as follows.

In the controller unit 100, a main controller 101, which is composed of a central processing unit (CPU), controls the entire recording apparatus 1 with a random access memory (RAM) 106 used as a work area according to programs and various parameters stored in a read-only memory (ROM) 107. For example, when a print job is input from a host device 400 via a host interface (I/F) 102 or a wireless I/F 103, an image processing unit 108 performs predetermined image processing on the received image data according to an instruction from the main controller 101. Then, the main controller 101 transmits the image data subjected to image processing to the print engine unit 200 via a print engine I/F 105.

Furthermore, the recording apparatus 1 can acquire image data (a print job) from the host device 400 via wireless communication or wired communication, or can acquire image data from an external storage device (such as a Universal Serial Bus (USB) memory) connected to the recording apparatus 1. The communication method to be used for wireless communication or wired communication is not limited. For example, the communication method to be used for wireless communication includes Wi-Fi® (Wireless Fidelity) and Bluetooth®. Moreover, the communication method to be used for wired communication includes Universal Serial Bus (USB). Moreover, for example, when a read command is input from the host device 400, the main controller 101 transmits the read command to the scanner unit 3 via a scanner engine I/F 109.

An operation panel 104 is a mechanism used for the user to perform inputting or outputting with respect to the recording apparatus 1. The user is allowed to use the operation panel 104 to issue an instruction for an operation such as copying or scanning, set a printing mode, or recognize information about the recording apparatus 1.

In the print engine unit 200, the print controller 202, which is composed of a CPU, controls various mechanisms included in the printing unit 2 with a RAM 204 used as a work area according to programs and various parameters stored in a ROM 203. When various commands or image data is received via a controller I/F 201, the print controller 202 temporarily stores those commands or image data in the RAM 204. In order for the recording head 8 to be able to use image data for the recording operation, the print controller 202 causes an image processing controller 205 to convert the stored image data into recording data. Upon generation of recording data, the print controller 202 causes the recording head 8 to perform a recording operation that is based on the recording data via a head I/F 206. At this time, the print controller 202 drives the feed units 6A and 6B, the conveyance rollers 7, the discharge roller 12, and the diverter 11 illustrated in FIG. 1 via a conveyance control unit 207, thus conveying the recording medium S. Additionally, the conveyance control unit 207 controls the paper detection sensor 20, periodically acquires outputs of the paper detection sensor 20 obtained when the recording medium S is conveyed, and stores data generated based on outputs of the paper detection sensor 20 in the RAM 204. The recording operation is performed by the recording head 8 in conjunction with the conveyance operation of the recording medium S according to an instruction from the print controller 202, so that print processing is performed.

A head carriage control unit 208 changes the orientation or position of the recording head 8 according to an operating state, such as a maintenance state or a recording state, of the recording apparatus 1. An ink supply control unit 209 controls the ink supply unit 15 in such a manner that the pressure of ink which is supplied to the recording head 8 falls within an appropriate range. When a maintenance operation is performed on the recording head 8, a maintenance control unit 210 controls operations of the cap unit 10 and the wiping unit 17 in the maintenance unit 16.

A contamination detection control unit 211 processes output data of the conveyance control unit 207 stored in the RAM 204, and, when the output data exceeds a threshold value, the contamination detection control unit 211 communicates an instruction for prompting cleaning to the operation panel 104 via the controller I/F 201. A detailed sequence thereof is described below.

In the scanner engine unit 300, the main controller 101 controls hardware resources of a scanner controller 302 with the RAM 106 used as a work area according to programs and various parameters stored in the ROM 107. This causes various mechanisms included in the scanner unit 3 to be controlled. For example, the main controller 101 controls hardware resources included in the scanner controller 302 via a controller I/F 301, thus causing a document placed on the ADF by the user to be conveyed via a conveyance control unit 304 and to be read by a sensor 305. Then, the scanner controller 302 stores the read image data in a RAM 303. Furthermore, the print controller 202 converts the image data acquired in the above-described way into recording data, thus being able to cause the recording head 8 to perform a recording operation that is based on the image data read by the scanner controller 302.

Figure 3:
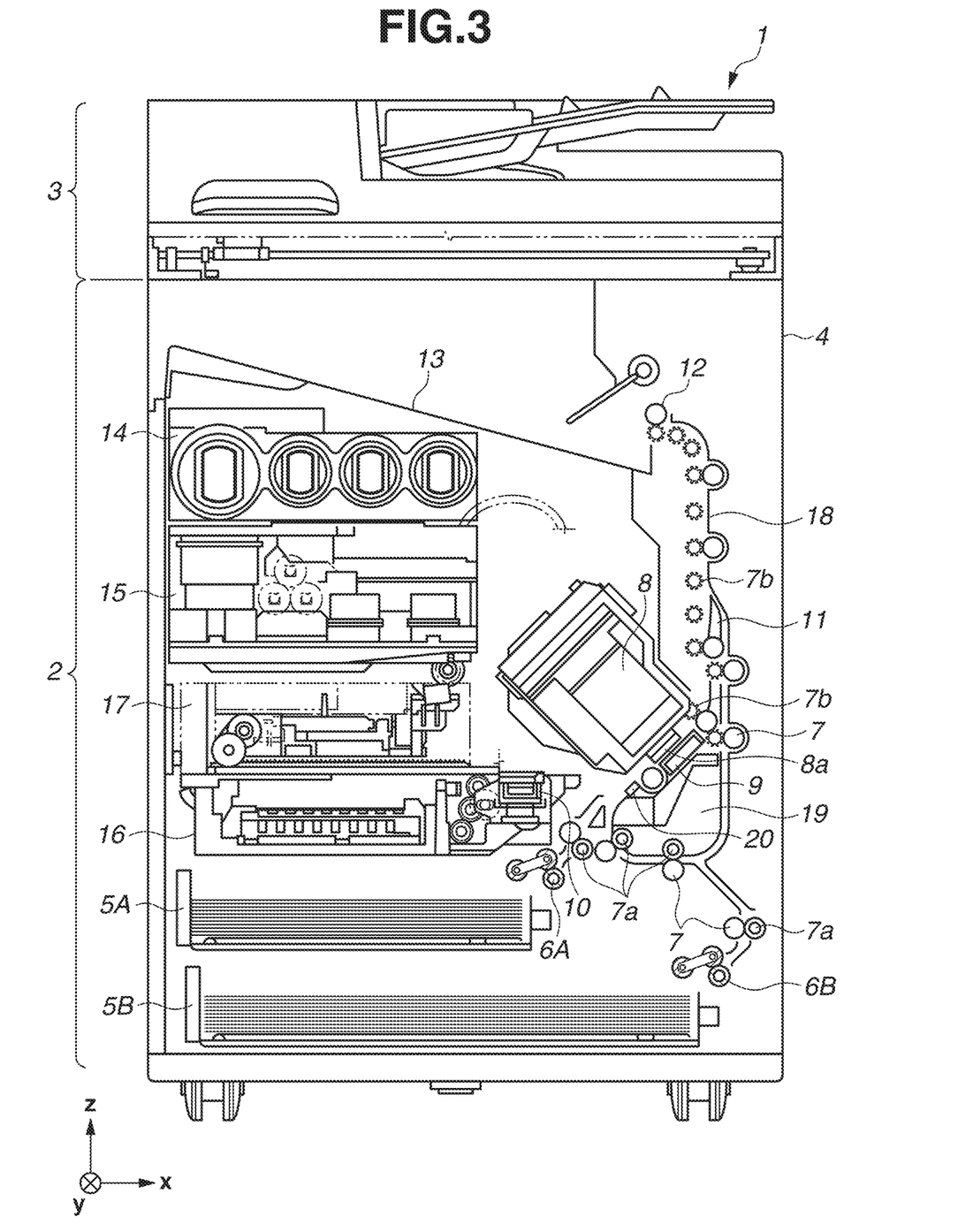
FIG. 3 is a diagram illustrating the detection apparatus being in a recording state.

FIG. 3 is a sectional view of the recording apparatus 1 obtained when the recording apparatus 1 is in a recording state. Furthermore, the recording state is a state in which the recording head 8 is situated in the recording position and is enabled to record an image on a recording medium. In comparison with the sectional view of the recording apparatus 1 obtained when the recording apparatus 1 is in the standby state illustrated in FIG. 1, the cap unit 10 is separate from the ejection port surface 8a of the recording head 8 and the ejection port surface 8a faces the platen 9. Furthermore, the standby state is a state in which the recording head 8 is situated in the standby position and is not performing recording of an image. In the present exemplary embodiment, the flat surface of the platen 9 is inclined about 45 degrees with respect to the horizontal direction, and the ejection port surface 8a of the recording head 8 in the recording position is also inclined about 45 degrees with respect to the horizontal direction in such a manner that the distance between the ejection port surface 8a and the platen 9 is kept constant.

When the recording head 8 moves from the standby position illustrated in FIG. 1 to the recording position illustrated in FIG. 3, the print controller 202 causes the maintenance control unit 210 to move down the cap unit 10 to the retracted position illustrated in FIG. 3. This causes the ejection port surface 8a of the recording head 8 to be separate from the cap unit 10. After that, the print controller 202 causes the head carriage control unit 208 to rotate the recording head 8 by 45 degrees while adjusting the height of the recording head 8 in the vertical direction, thus causing the ejection port surface 8a to face the platen 9. When the recording operation is completed and the recording head 8 moves from the recording position to the standby position, a process opposite to the above-described process is performed by the print controller 202.

Next, the conveyance path for a recording medium S in the printing unit 2 is described. When a recording command is input, the print controller 202 first causes the maintenance control unit 210 and the head carriage control unit 208 to move the recording head 8 to the recording position illustrated in FIG. 3. After that, the print controller 202 causes the conveyance control unit 207 to drive any one of the first feed unit 6A and the second feed unit 6B according to the recording command, thus feeding a recording medium S.

When the recording medium S enters the position facing the paper detection sensor 20 (a medium pathway portion) in the present exemplary embodiment, the output of the paper detection sensor 20 changes as described below. In the present exemplary embodiment, the medium pathway portion includes at least a part of a path of light from a point at which the light is reflected by the reflective plate to a point at which the light is received by the light receiving element. The paper detection sensor 20 compares the output thereof with a prescribed threshold value and is thus able to identify not only the presence or absence of a recording medium S in the medium pathway portion but the times at which the leading edge and trailing edge of the recording medium S have passed through the medium pathway portion. The recording apparatus 1 according to the present exemplary embodiment uses such functions, thus being able to, for example, adjust the position of a recording medium S during conveyance thereof, detect abnormality of conveyance of a recording medium S, and identify the paper length of a recording medium S and, therefore, being able to perform a stable printing operation.

Furthermore, a program for implementing one or more functions of the recording apparatus 1 according to the present exemplary embodiment can be provided to an apparatus via a network or any type of storage medium and a computer (for example, a CPU or a micro processing unit (MPU)) of the apparatus can read out the program and execute such functions. Moreover, the program can be executed by one computer or can be executed by a plurality of computers in conjunction with each other. Besides, not all of the above-described processing operations do not need to be implemented by software, but a part or the whole of the processing operations can be implemented by hardware such as an application specific integrated circuit (ASIC). Additionally, the present exemplary embodiment is not limited to a configuration in which one CPU performs all of the processing operations, but a configuration in which a plurality of CPUs performs processing operations while cooperating with each other as appropriate can be employed, or a configuration in which one CPU performs any one of processing operations and a plurality of CPUs performs the other processing operations while cooperating with each other can be employed.

Figure 4A:
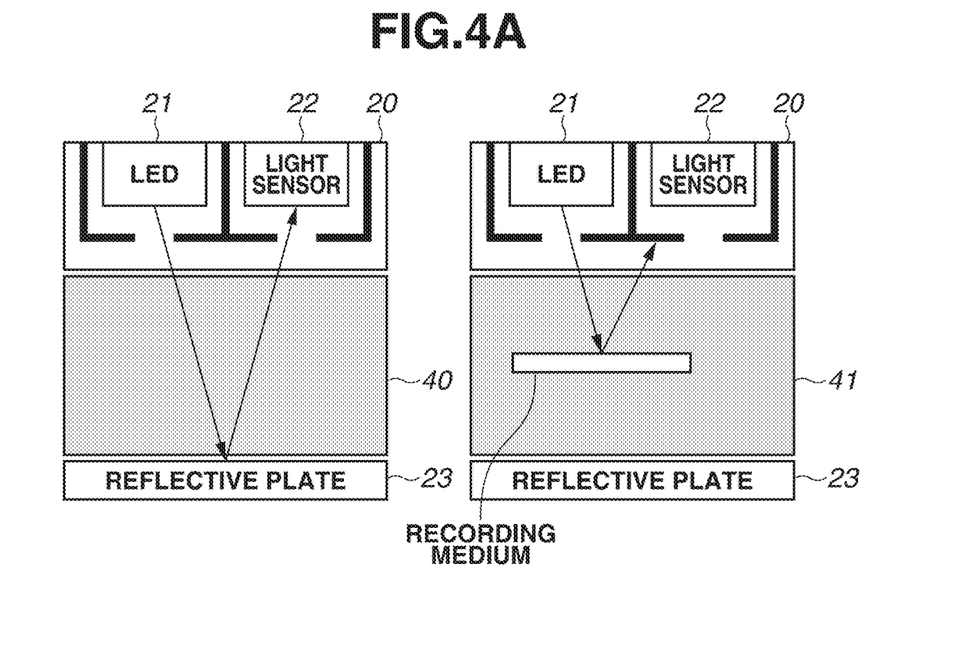
FIGS. 4A and 4B are a schematic configuration diagram of a paper detection sensor and a diagram illustrating a configuration surrounding the paper detection sensor, respectively.
Figure 4B:
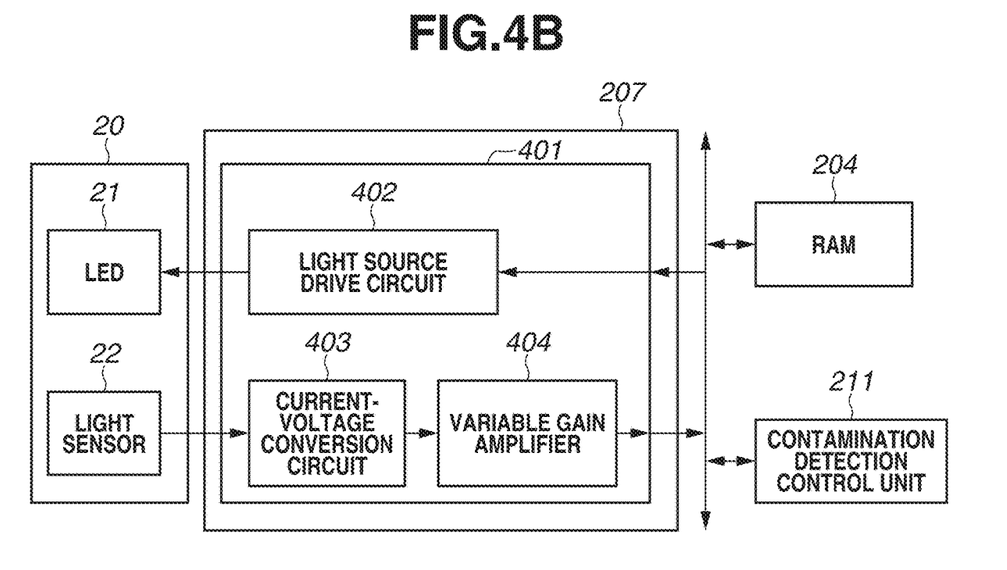

FIG. 4A is a schematic configuration diagram of the paper detection sensor 20, and FIG. 4B is a diagram illustrating a configuration surrounding the paper detection sensor 20.

The paper detection sensor 20 includes a light-emitting element (LED) 21, which serves as a light emitting element to emit infrared light, and a light sensor 22, which serves as a light receiving element. A reflective plate 23 is located at the position facing the paper detection sensor 20 across the medium pathway portion, through which a recording medium passes. Light emitted by the LED 21 is reflected by the reflective plate 23. Such reflected light is received by the light sensor 22.

Here, a state 40 indicates a state in which any recording medium is not passing through the medium pathway portion facing the paper detection sensor 20, and a state 41 indicates a state in which a recording medium is passing through the medium pathway portion facing the paper detection sensor 20. In the state in which any recording medium is not passing through the medium pathway portion facing the paper detection sensor 20, the light sensor 22 directly receives reflected light from the reflective plate 23. In the state in which a recording medium is passing through the medium pathway portion facing the paper detection sensor 20 (a case where a recording medium is situated on a path for light emitted from the LED 21), the light sensor 22 receives reflected light from the recording medium.

Furthermore, since the recording medium absorbs a part of light or allows a part of light to pass therethrough, reflected light from the recording medium is smaller in light quantity than reflected light from the reflective plate. In the present exemplary embodiment, the light sensor 22 and the reflective plate 23 are located in such a manner that the light quantity of reflected light from the reflective plate 23 which reaches the light sensor 22 is approximately the maximum light quantity which the light sensor 22 is able to detect. Therefore, the quantity of light received by the light sensor 22 when a recording medium is passing through the medium pathway portion becomes sufficiently smaller than the quantity of received light from the reflective plate 23.

The recording apparatus 1 according to the present exemplary embodiment is able to detect the presence or absence of a recording medium in the medium pathway portion or detect the positions, such as the leading edge and trailing edge, of a recording medium based on the light quantity of light received by the light sensor 22 (the quantity of received light).

Furthermore, the positional relationship between the LED 21 or the light sensor 22 in the paper detection sensor 20, the medium pathway portion, and the reflective plate 23 is not limited to that in the above-described exemplary embodiment. Each constituent element is to be located such that a recording medium at least passes through at least a part of a path through which reflected light passes from a point at which the light is reflected by the reflective plate 23 to a point at which the light is received by the light sensor 22.

A configuration of portions surrounding the paper detection sensor 20 is described with reference to FIG. 4B.

The paper detection sensor 20 is connected to the conveyance control unit 207, the RAM 204, and the contamination detection control unit 211, as illustrated in FIG. 2. The conveyance control unit 207 includes a paper detection sensor control unit 401. The paper detection sensor control unit 401 includes a light source drive circuit 402, a current-voltage conversion circuit 403, and a variable gain amplifier 404. The light source drive circuit 402 changes the quantity of light which the LED 21 radiates. The current-voltage conversion circuit 403 converts a photocurrent, which is output by the light sensor 22 according to the quantity of received light, into a voltage. The variable gain amplifier 404 changes the sensitivity of the light sensor 22. Furthermore, in the present exemplary embodiment, a value obtained by performing analog-to-digital (A/D) conversion and inversion amplification on a voltage into which the current-voltage conversion circuit 403 has converted a photocurrent output by the light sensor 22 according to the quantity of received light is defined as a sensor detection amount. The paper detection sensor control unit 401 controls the paper detection sensor 20, periodically acquires the sensor detection amount, and stores the acquired sensor detection amount as a sensor detection amount waveform in the RAM 204.

The contamination detection control unit 211 detects whether there is a contamination on the reflective plate 23, based on the sensor detection amount waveform stored in the RAM 204 by the conveyance control unit 207. On the reflective plate 23, there may be a contamination occurring, for example, due to paper dust arising from paper while the paper is being conveyed or due to ink dispersed in a spraying manner during printing. If there is a contamination on the reflective plate 23, the reflectance of the reflective plate 23 for light decreases. In the present exemplary embodiment, in a case where the reflectance of the reflective plate 23 for light has decreased, to restore it, the contamination detection control unit 211 detects whether there is a contamination on the reflective plate 23, and then performs processing corresponding to a result of detection. Detecting whether there is a contamination on the reflective plate 23 can be said to be detecting whether there is a decrease in the reflectance of the reflective plate 23 for light. Furthermore, the contamination detection control unit 211 performs contamination detection control by extracting a sensor detection amount obtained when a recording medium is passing through the medium pathway portion facing the paper detection sensor 20 and then comparing the extracted sensor detection amount with a previously-set prescribed value.

Figure 5:
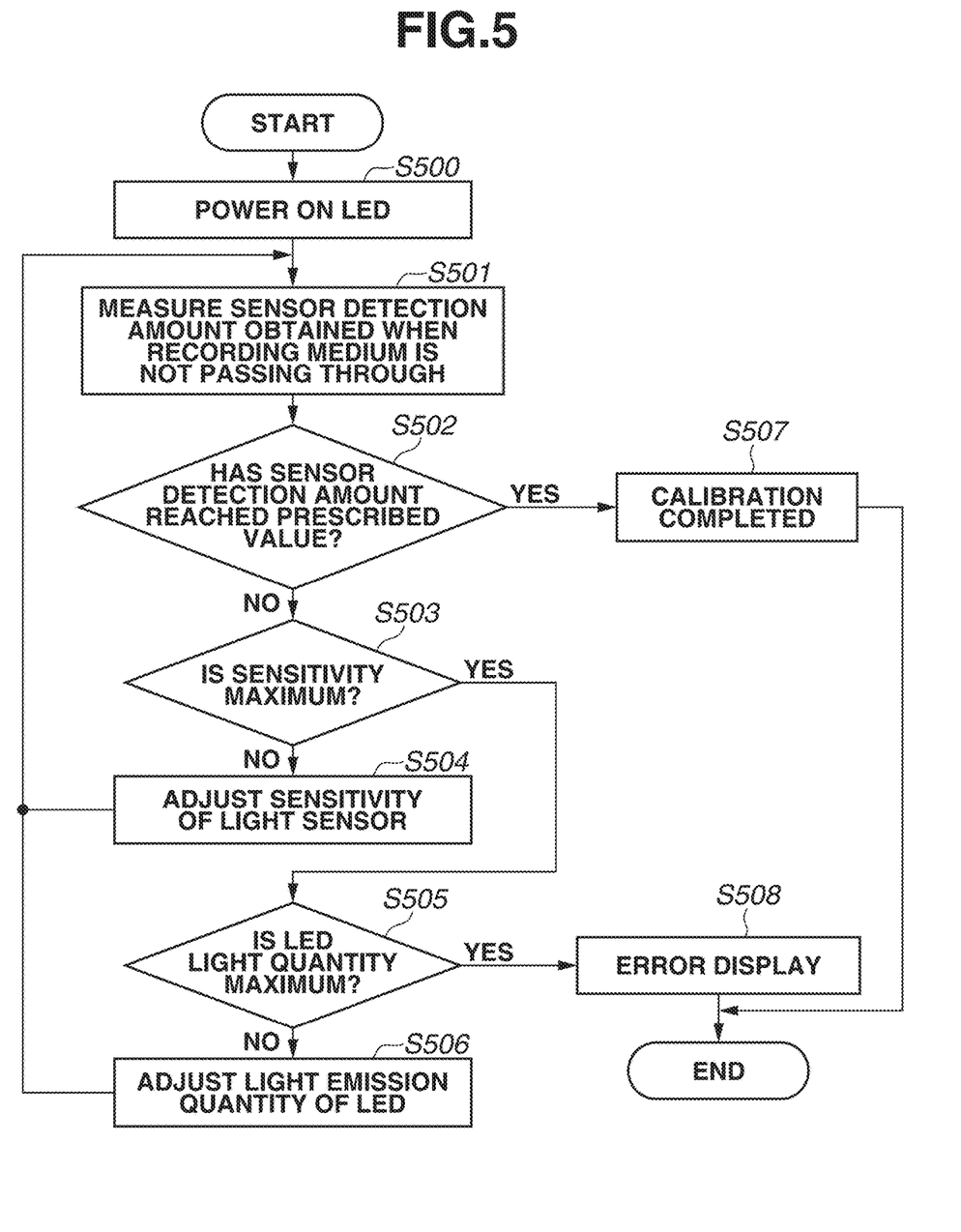
FIG. 5 is a flowchart illustrating calibration processing which the detection apparatus performs.

FIG. 5 is a flowchart illustrating calibration processing (control processing) which the recording apparatus 1 performs. The calibration processing is processing for performing control such that the sensor detection amount that is based on the quantity of light received from the reflective plate 23 when a recording medium is not passing through the medium pathway portion facing the paper detection sensor 20 becomes constant at a prescribed value. Specifically, the calibration processing is processing for controlling at least one of the light quantity of light which the LED 21 radiates and the sensitivity of the light sensor 22. Furthermore, the processing illustrated in the flowchart of FIG. 5 is actually implemented by the main controller 101 loading a program stored in a memory, such as the ROM 107, onto the RAM 106 and then executing the program. Moreover, during the calibration processing, a recording medium is controlled in such a way as not to pass through the medium pathway portion.

First, in step S500, the recording apparatus 1 powers on the LED 21. Accordingly, the LED 21 starts radiating light.

In step S501, after the light quantity of light which the LED 21 radiates becomes stable, the recording apparatus 1 measures a sensor detection amount obtained when the recording medium is not passing through the medium pathway portion facing the paper detection sensor 20 (the quantity of received light from the reflective plate 23).

In step S502, the recording apparatus 1 determines whether the sensor detection amount measured in step S501 has reached a prescribed value. The prescribed value is a threshold value for identifying whether the calibration processing has been completed (the sensor detection amount output by the paper detection sensor control unit 401 has become an appropriate value). If it is determined that the sensor detection amount has reached the prescribed value (YES in step S502), then in step S507, the recording apparatus 1 identifies the calibration processing being completed and ends the calibration processing. On the other hand, if it is determined that the sensor detection amount has not reached the prescribed value (NO in step S502), the recording apparatus 1 advances the processing to step S503.

In step S503, the recording apparatus 1 determines whether the sensitivity of the light sensor 22 is maximum. If it is determined that the sensitivity of the light sensor 22 is not maximum (NO in step S503), the recording apparatus 1 advances the processing to step S504, and, if it is determined that the sensitivity of the light sensor 22 is maximum (YES in step S503), the recording apparatus 1 advances the processing to step S505.

In step S504, the recording apparatus 1 causes the variable gain amplifier 404 to change the gain, thus increasing the sensitivity of the light sensor 22. The sensitivity is the degree of the sensor detection amount that is output with respect to a given quantity of received light. Even if the quantity of received light is the same, the sensitivity being increased leads to the sensor detection amount being decreased (being decreased is due to the sensor detection amount being subjected to inversion amplification).

In step S505, the recording apparatus 1 determines whether the quantity of light which is radiated by the LED 21 is maximum. If it is determined that the quantity of light which is radiated by the LED 21 is not maximum (NO in step S505), the recording apparatus 1 advances the processing to step S506. If it is determined that the quantity of light which is radiated by the LED 21 is maximum, this means that, even if the adjustment of the sensitivity of the light sensor 22 by the variable gain amplifier 404 and the adjustment of the quantity of light which is radiated by the LED 21 are performed, the sensor detection amount output by the paper detection sensor control unit 401 has not reached the prescribed value. Therefore, if it is determined that the quantity of light which is radiated by the LED 21 is maximum (YES in step S505), the recording apparatus 1 advances the processing to step S508.

In step S506, the recording apparatus 1 increases the quantity of light which is radiated by the LED 21.

In step S508, the recording apparatus 1 notifies the user that an error has occurred in the calibration processing. Specifically, the recording apparatus 1 displays, on the operation panel 104 (display unit), a screen used to notify the user that an error has occurred in the calibration processing, or transmits, to the host device 400, information for causing the screen to be displayed on a display unit of the host device 400. Furthermore, the cause of occurrence of an error is, for example, a malfunction of the light sensor 22 or the LED 21 or a contamination of the reflective plate 23. A region for notification for such a cause can be included in the screen used to notify the user that an error has occurred in the calibration processing. Moreover, in step S508, processing for restoring the reflectance of the reflective plate 23 for light, which is described below, can be performed.

Furthermore, if the calibration processing is not performed, the recording apparatus 1 cannot determine whether a change of the sensor detection amount has been caused by a decrease in the light quantity of the LED 21, a degradation of the light sensor 22, a change in environmental temperature, or a contamination of the reflective plate 23.

Therefore, the calibration processing is to be frequently performed. The timing at which the calibration processing is performed is, for example, timing at which the paper detection sensor 20 is powered on. Specifically, for example, such timing is when the recording apparatus 1 has been powered on, when the recording apparatus 1 has returned from a sleep state, when the first feed unit 6A or the second feed unit 6B has been set, or when a cover for opening an inside portion provided on the casing of the recording apparatus 1 has been closed.

Figure 6A:
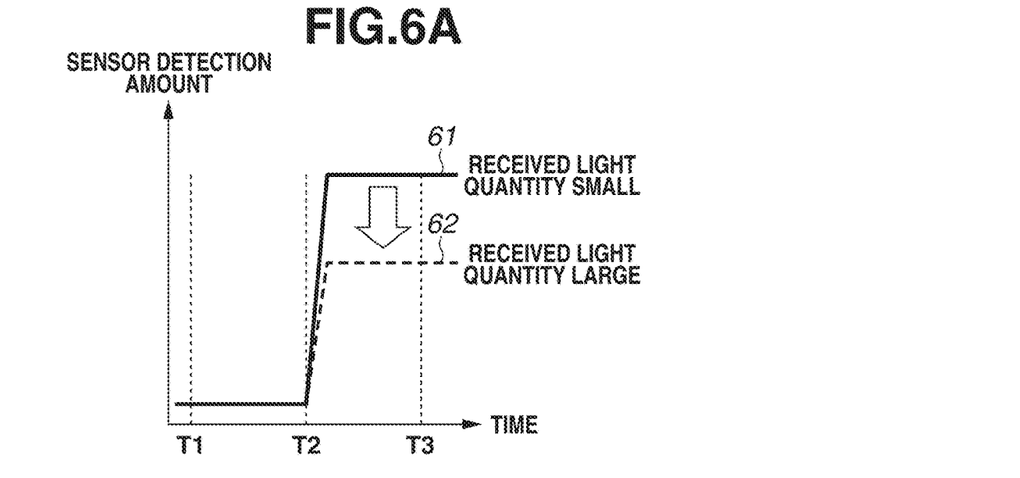
FIGS. 6A, 6B, and 6C are diagrams used to explain contamination detection control which the detection apparatus performs.

FIG. 6A is a diagram illustrating a temporal change of the sensor detection amount in a state in which the calibration processing is performed such that the sensor detection amount obtained in a state in which a recording medium is not passing through the medium pathway portion facing the paper detection sensor 20 becomes a prescribed value. Furthermore, in the present exemplary embodiment, since the output of the paper detection sensor control unit 401 is a result of inversion amplification performed by the variable gain amplifier 404, as the quantity of light received by the light sensor 22 is smaller, the sensor detection amount becomes larger. An output waveform 61 is an output waveform indicating the sensor detection amount obtained in a state in which there is no contamination (or there is a small contamination) on the reflective plate 23, and an output waveform 62 is an output waveform indicating the sensor detection amount obtained in a state in which there is a contamination on the reflective plate 23. Furthermore, here, it is assumed that, at time T2, the recording medium begins to pass through the medium pathway portion facing the paper detection sensor 20.

Owing to the calibration processing, the sensor detection amount obtained in a state in which the recording medium is not passing through the medium pathway portion facing the paper detection sensor 20 (a period from time T1 to time T2) is kept constant at a prescribed value (for example, 0.5 V). After that, in a state in which the recording medium is passing through the medium pathway portion facing the paper detection sensor 20 (a period from time T2 to time T3), the quantity of light which the light sensor 22 receives becomes small (the sensor detection amount becomes large).

When a contamination on the reflective plate 23 progresses, since the reflection efficiency of the reflective plate 23 decreases, the quantity of received light of the light sensor 22 in a state in which the recording medium is not passing through the medium pathway portion facing the paper detection sensor 20 decreases. However, if the calibration processing is performed, the sensor detection amount that is based on the quantity of received light of the light sensor 22 in a state in which the recording medium is not in the medium pathway portion facing the paper detection sensor 20 is set to be a prescribed value. In other words, depending on a decrease in the quantity of received light due to the contamination of the reflective plate 23, at least one of the emission intensity of the LED 21 and the light receiving sensitivity of the light sensor 22 is increased.

When the recording medium passes through the medium pathway portion facing the paper detection sensor 20 in a state in which at least one of the emission intensity of the LED 21 and the light receiving sensitivity of the light sensor 22 is increased by calibration, the sensor detection amount becomes smaller than that before calibration is performed. In other words, in a state in which the recording medium has passed through the medium pathway portion facing the paper detection sensor 20, the sensor detection amount decreases following the contamination of the reflective plate 23, i.e., a decrease in reflection efficiency. Furthermore, the reason that the sensor detection amount decreases following a decrease in reflection efficiency is that the sensor detection amount is an amount subjected to inversion amplification, and, if the sensor detection amount is not an amount subjected to inversion amplification, the sensor detection amount increases following a decrease in reflection efficiency.

Figure 6B:
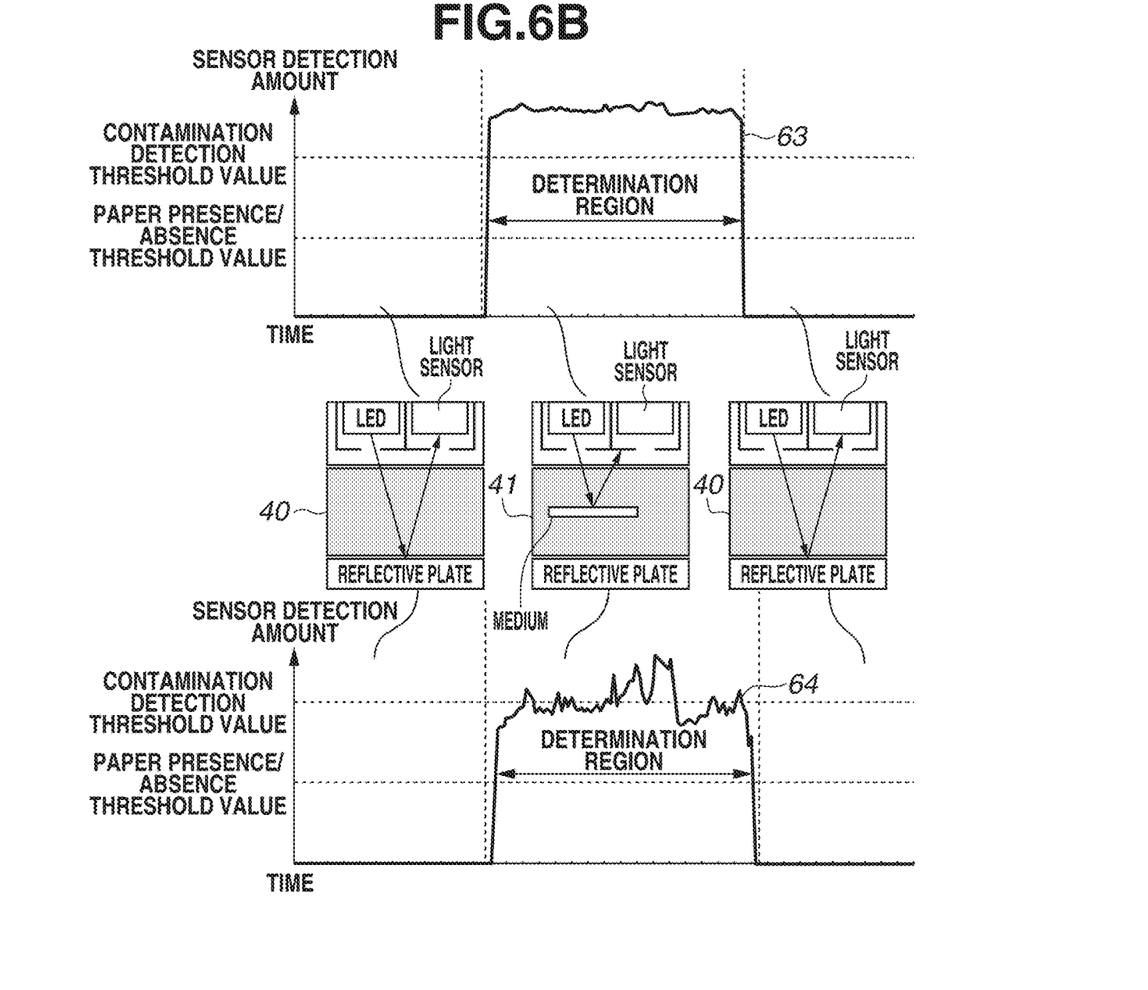

A graph at the upper side in FIG. 6B is a diagram illustrating a temporal change of the sensor detection amount in a state in which there is no contamination on the reflective plate 23 and the calibration processing has been performed (a normal sensor detection amount). Moreover, a graph at the lower side in FIG. 6B is a diagram illustrating a temporal change of the sensor detection amount in a state in which there is a contamination on the reflective plate 23 and the calibration processing has been performed (an abnormal sensor detection amount). An output waveform 63 is the output waveform of the normal sensor detection amount, and an output waveform 64 is the output waveform of the abnormal sensor detection amount.

In the normal sensor detection amount obtained in a state in which the recording medium is passing through the medium pathway portion facing the paper detection sensor 20 (state 41), there is no decrease in the sensor detection amount caused by the contamination of the reflective plate 23. Therefore, the value of the normal sensor detection amount obtained in a state in which the recording medium is passing through the medium pathway portion facing the paper detection sensor 20 (state 41) exceeds a contamination detection threshold value.

On the other hand, in the abnormal sensor detection amount obtained in a state in which the recording medium is passing through the medium pathway portion facing the paper detection sensor 20 (state 41), there is a decrease in the sensor detection amount caused by the contamination of the reflective plate 23. Therefore, the value of the abnormal sensor detection amount obtained in a state in which the recording medium is passing through the medium pathway portion facing the paper detection sensor 20 (state 41) falls below the contamination detection threshold value.

In this way, after the calibration processing is performed, the sensor detection amount obtained in a state in which the recording medium is passing through the medium pathway portion facing the paper detection sensor 20 (state 41) changes depending on whether there is a contamination on the reflective plate 23. In the present exemplary embodiment, with use of this principle, the recording apparatus 1 is able to perform detection of a decrease in the reflection efficiency of the reflective plate 23, i.e., determination of the degree of contamination of the reflective plate 23.

In the present exemplary embodiment, the recording apparatus 1 performs detection processing for detecting whether there is a contamination on the reflective plate 23, with use of the sensor detection amount obtained in a state in which the recording medium is passing through the medium pathway portion facing the paper detection sensor 20 (state 41).

Therefore, first, the recording apparatus 1 identifies the sensor detection amount obtained in a state in which the recording medium is passing through the medium pathway portion facing the paper detection sensor 20 (state 41). Specifically, first, the recording apparatus 1 identifies the time at which the conveyance of the recording medium has ended, based on an end time of the print job. Then, going back from the identified time, the recording apparatus 1 identifies the time at which the sensor detection amount has reached a paper presence/absence threshold value (the time at which the sensor detection amount has rapidly increased), and, further going back, identifies the time at which the sensor detection amount has reached the paper presence/absence threshold value again (the time at which the sensor detection amount has rapidly decreased). With this, the recording apparatus 1 identifies the sensor detection amount obtained in a state in which the recording medium is passing through the medium pathway portion facing the paper detection sensor 20 (state 41). The recording apparatus 1 uses the range of the sensor detection amount identified in this way (hereinafter referred to as a "determination range") for the determination described below. Furthermore, in consideration of an influence of noise, a range excluding sensor detection amounts at several points immediately after the sensor detection amount has reached the paper presence/absence threshold value and sensor detection amounts at several points immediately after the sensor detection amount has reached the paper presence/absence threshold value gain can be used as the determination range.

In the present exemplary embodiment, if there is at least one sensor detection amount which falls below the contamination detection threshold value within the determination range, the recording apparatus 1 determines that there is a contamination on the reflective plate 23.

Furthermore, the paper presence/absence threshold value is a value corresponding to a light quantity larger than the light quantity corresponding to the contamination detection threshold value. Moreover, setting is performed such that there is a sufficient margin between the contamination detection threshold value and the paper presence/absence threshold value, and contamination detection control is frequently performed. With this, it is possible to detect a contamination of the reflective plate 23 before the presence or absence of a recording medium is falsely detected due to a decrease in the sensor detection amount caused by the contamination of the reflective plate 23.

Figure 6C:
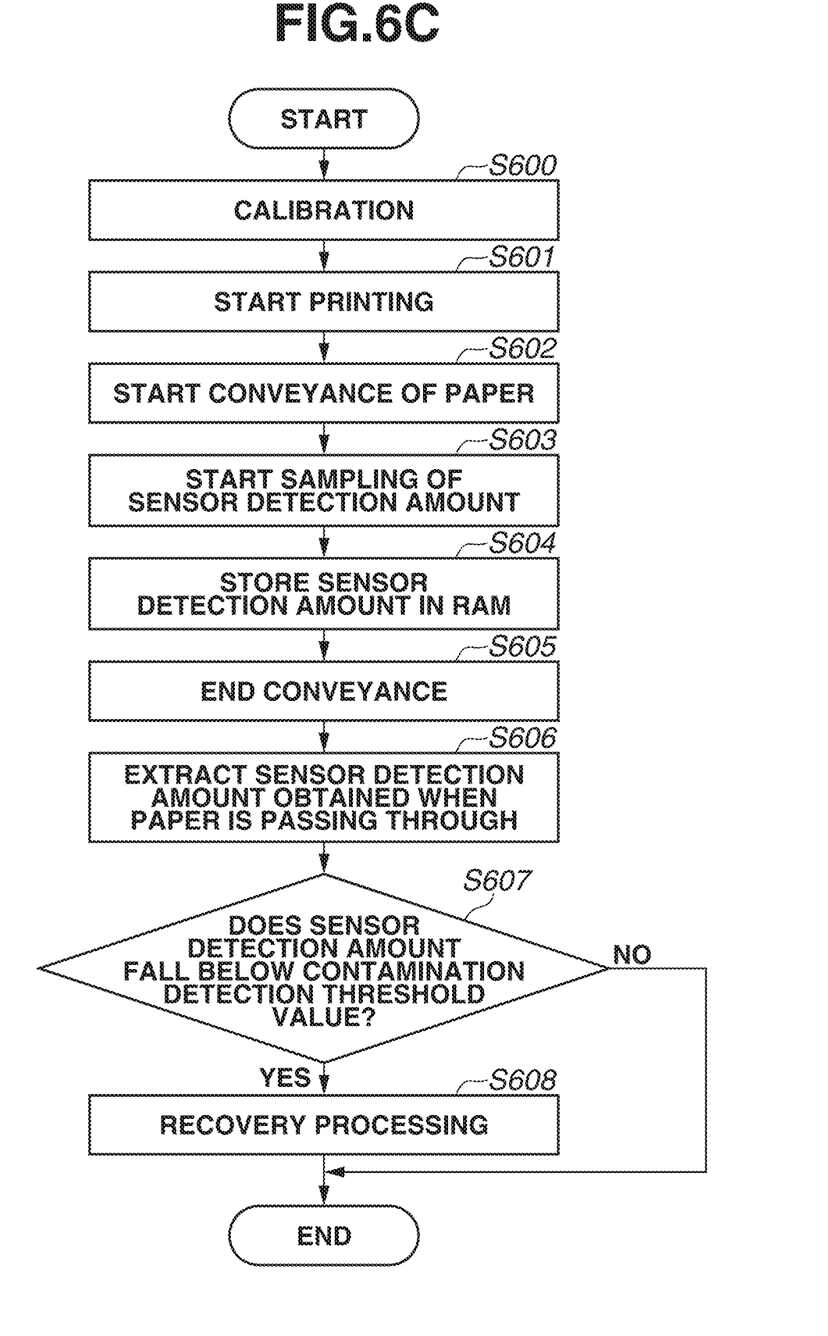

FIG. 6C is a flowchart illustrating contamination detection control which the recording apparatus 1 performs.

Furthermore, the processing illustrated in the flowchart of FIG. 6C is actually implemented by the main controller 101 loading a program stored in a memory, such as the ROM 107, onto the RAM 106 and then executing the program. Furthermore, the processing illustrated in the flowchart of FIG. 6C is performed, for example, when a print job is received from the host device 400.

In step S600, the recording apparatus 1 performs the calibration processing illustrated in FIG. 5. This causes adjustment to be performed such that the sensor detection amount obtained in a state in which a recording medium is not passing through the medium pathway portion facing the paper detection sensor 20 becomes constant at a prescribed value.

In step S601, the recording apparatus 1 starts print control that is based on a print job received from the host device 400.

In step S602, the recording apparatus 1 starts conveyance of the recording medium based on the received print job.

In step S603, the recording apparatus 1 starts sampling (acquisition) of the sensor detection amount with a specific period.

In step S604, the recording apparatus 1 stores the acquired sensor detection amount as a waveform such as that illustrated in FIG. 6A or 6B in the RAM 204.

In step S605, the recording apparatus 1 ends printing that is based on the print job and ends the conveyance of the recording medium.

In step S606, the recording apparatus 1 reads out the waveform of the sensor detection amount obtained from the time of starting of the print control from the RAM 204 and extracts (identifies) the sensor detection amount obtained in a state in which the recording medium is passing through the medium pathway portion facing the paper detection sensor 20 (state 41).

In step S607, the recording apparatus 1 determines whether there is a contamination on the reflective plate 23 based on the sensor detection amount extracted in step S606. Specifically, the recording apparatus 1 determines whether the sensor detection amount extracted in step S606 falls below the contamination detection threshold value. If it is determined that the sensor detection amount falls below the contamination detection threshold value (YES in step S607), the recording apparatus 1 advances the processing to step S608, and, if it is determined that the sensor detection amount does not fall below the contamination detection threshold value (NO in step S607), the recording apparatus 1 ends the processing.

In step S608, the recording apparatus 1 performs processing for restoring the reflectance of the reflective plate 23 for light based on a result of the determination in step S607 being YES in determination. Such processing is, for example, notification processing for notifying the user that there is a contamination on the reflective plate 23. Specifically, for example, as the notification processing, the recording apparatus 1 displays, on the operation panel 104, a notification screen for notifying the user that there is a contamination on the reflective plate 23, or transmits, to the host device 400, information for displaying the notification screen on a display unit of the host device 400. Furthermore, the notification screen can include, for example, a region for instructing the user to clean the reflective plate 23 or a region for presenting a method of cleaning the reflective plate 23 to the user. Furthermore, the processing in step S608 can be, for example, processing for merely notifying the user of an error or processing for prompting maintenance of the recording apparatus 1. Moreover, the processing in step S608 can be processing for prompting the user to call a service engineer for recovering from an error concerning the reflective plate 23.

Using the configuration of the present exemplary embodiment enables detecting a contamination of the reflective plate. Therefore, in a case where there is a contamination on the reflective plate, it is possible to notify the user of the presence of such a contamination. Then, the user is prompted to clean the reflective plate, so that an error caused by a contamination of the reflective plate (for example, an abnormality in conveyance) can be prevented or reduced from occurring.

Moreover, in the present exemplary embodiment, a contamination of the reflective plate is detected based on the sensor detection amount which is used to detect the leading edge and trailing edge of a recording medium so as to perform conveyance control. Thus, conveyance control and contamination detection control are performed with use of the same data. Therefore, the recording apparatus 1 does not need to acquire a new sensor detection amount for contamination detection control, so that a load on the recording apparatus 1 can be reduced.

While, in the above-described exemplary embodiment, if at least one of a plurality of sensor detection amounts obtained in a state in which the recording medium is passing through the medium pathway portion facing the paper detection sensor 20 (state 41) falls below the contamination detection threshold value, notification processing is performed, the exemplary embodiment is not limited to this configuration. For example, a configuration in which, if a value obtained by performing a moving average of a plurality of sensor detection amounts exceeds the contamination detection threshold value, notification processing is performed can be employed. Moreover, a configuration in which, if two or more of a plurality of sensor detection amounts exceed the contamination detection threshold value, notification processing is performed can be employed. Moreover, a configuration in which, if successive two or more of a plurality of sensor detection amounts exceed the contamination detection threshold value, notification processing is performed can be employed. Moreover, the method for notification (for example, the content of a notification screen) can be changed depending on the number of sensor detection amounts which exceed the contamination detection threshold value or depending on how many sensor detection amounts which exceed the contamination detection threshold value are successive.

Moreover, while, in the above-described exemplary embodiment, in a case where a contamination of the reflective plate 23 has been detected, notification processing is performed as processing for restoring the reflectance of the reflective plate 23 for light (step S608), the exemplary embodiment is not limited to this configuration. For example, a configuration in which a structure for restoring the reflectance of the reflective plate 23 for light is added to the recording apparatus 1 and cleaning processing for the recording apparatus 1 to automatically clean the reflective plate 23 is performed as processing for restoring the reflectance of the reflective plate 23 for light can be employed.

Moreover, in the above-described exemplary embodiment, the output of the paper detection sensor control unit 401 is an output subjected to inversion amplification by the variable gain amplifier 404, but can be an output which is not subjected to inversion amplification by the variable gain amplifier 404. In that case, in step S607, the recording apparatus 1 determines whether the sensor detection amount extracted in step S606 exceeds the contamination detection threshold value.

Moreover, while, in the above-described exemplary embodiment, the contamination detection control during printing is performed in a case where a print job has been received from the host device 400, the exemplary embodiment is not limited to this configuration. For example, the contamination detection control during printing can be performed when the recording apparatus 1 performing reading of a document and printing of a copy of the read document is identified. Moreover, for example, a configuration in which the calibration processing and the test conveyance of paper are performed in an initializing operation of the recording apparatus 1 after the paper detection sensor 20 is powered on and the contamination detection control is performed based on an output value the paper detection sensor 20 obtained at the time of the test conveyance of paper can be employed.

The disclosure is not limited to the above-described exemplary embodiment, but can be modified or altered in various manners based on the gist of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-035519, filed Feb. 28, 2018, which is hereby incorporated by reference herein in its entirety.

What is claimed is:

1. An apparatus comprising:
a reflection unit configured to reflect light;
a light emitting unit configured to radiate light toward a direction in which the reflection unit is located;
a light receiving unit configured to receive light from an external including light reflected from the reflection unit;
an output unit configured to output an output value that is based on the received light;
a first detection unit configured to detect, based on the output value, whether a predetermined object is present in at least a part of a path of light from a point at which the light is reflected to a point at which the light is received;
a control unit configured to perform control such that a first output value which is output by the output unit based on the received light in a state in which the light emitting unit is radiating light and the predetermined object is not present in the path becomes a prescribed value; and
a second detection unit configured to detect whether there is a decrease in reflectance of the reflection unit for light, based on a second output value which is output by the output unit based on the received light in a state in which, after the first output value is controlled to become the prescribed value, the light emitting unit is radiating light and it is detected by the first detection unit that the predetermined object is present in the path.

2. The apparatus according to claim 1, further comprising an execution unit configured to perform predetermined processing based on a decrease in reflectance of the reflection unit for light.

3. The apparatus according to claim 2, wherein the predetermined processing is processing for recovering from a decrease in reflectance of the reflection unit for light.

4. The apparatus according to claim 3, wherein the predetermined processing is notification processing for notifying a user concerning the reflection unit or cleaning processing for cleaning the reflection unit.

5. The apparatus according to claim 4, wherein the predetermined processing is processing for displaying a screen for prompting cleaning of the reflection unit on a display unit.

6. The apparatus according to claim 1, wherein the control unit performs control such that the first output value becomes the prescribed value, by performing at least one of processing for increasing a quantity of light which is radiated by the light emitting unit and processing for increasing a sensitivity of the light receiving unit for light.

7. The apparatus according to claim 1, wherein the first detection unit detects, based on the second output value, whether the predetermined object is present in at least a part of the path.

8. The apparatus according to claim 1, wherein the second detection unit detects that there is a decrease in reflectance of the reflection unit for light, based on the second output value reaching a predetermined threshold value.

9. The apparatus according to claim 8, wherein the first detection unit detects that the predetermined object is passing through at least a part of the path, based on the second output value reaching a specific threshold value corresponding to a light quantity larger than a light quantity corresponding to the predetermined threshold value.

10. The apparatus according to claim 1, wherein the predetermined object is a recording medium.

11. The apparatus according to claim 10, further comprising an image forming unit configured to form an image on the recording medium with use of a recording agent.

12. The apparatus according to claim 11,
wherein the recording agent is ink, and
wherein the recording medium is paper.

13. A method for an apparatus including a reflection unit configured to reflect light, a light emitting unit configured to radiate light toward a direction in which the reflection unit is located, and a light receiving unit configured to receive light from an external including light reflected from the reflection unit, the method comprising:
outputting an output value that is based on the received light;
detecting, based on the output value, whether a predetermined object is present in at least a part of a path of light from a point at which the light is reflected to a point at which the light is received;
performing control such that a first output value which is output based on the received light in a state in which the light emitting unit is radiating light and the predetermined object is not present in the path becomes a prescribed value; and
detecting whether there is a decrease in reflectance of the reflection unit for light, based on a second output value which is output based on the received light in a state in which, after the first output value is controlled to become the prescribed value, the light emitting unit is radiating light and it is detected that the predetermined object is present in the path.

14. The method according to claim 13, further comprising performing predetermined processing based on a decrease in reflectance of the reflection unit for light.

15. The method according to claim 14, wherein the predetermined processing is processing for recovering from a decrease in reflectance of the reflection unit for light.

16. The method according to claim 15, wherein the predetermined processing is notification processing for notifying a user concerning the reflection unit or cleaning processing for cleaning the reflection unit.

17. The method according to claim 16, wherein the predetermined processing is processing for displaying a screen for prompting cleaning of the reflection unit on a display unit.

18. The method according to claim 13, further comprising performing control such that the first output value becomes the prescribed value, by performing at least one of processing for increasing a quantity of light which is radiated by the light emitting unit and processing for increasing a sensitivity of the light receiving unit for light.

19. The method according to claim 13, further comprising detecting, based on the second output value, whether the predetermined object is present in at least a part of the path.

20. The method according to claim 13, further comprising detecting that there is a decrease in reflectance of the reflection unit for light, based on the second output value reaching a predetermined threshold value.

* * * * *